US010772140B2

(12) United States Patent
Wu et al.

(10) Patent No.: US 10,772,140 B2
(45) Date of Patent: Sep. 8, 2020

(54) COMMUNICATIONS DEVICE CONNECTION METHOD, TERMINAL DEVICE, AND SERVER SYSTEM

(71) Applicant: TENCENT TECHNOLOGY (SHENZHEN) COMPANY LIMITED, Shenzhen, Guangdong (CN)

(72) Inventors: Jingcheng Wu, Guangdong (CN); Xiaojun Deng, Guangdong (CN); Shihai Cheng, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 99 days.

(21) Appl. No.: 15/764,993

(22) PCT Filed: Feb. 3, 2017

(86) PCT No.: PCT/CN2017/072868
§ 371 (c)(1),
(2) Date: Mar. 30, 2018

(87) PCT Pub. No.: WO2017/133677
PCT Pub. Date: Aug. 10, 2017

(65) Prior Publication Data
US 2018/0270883 A1  Sep. 20, 2018

(30) Foreign Application Priority Data

Feb. 2, 2016 (CN) .......................... 2016 1 0073994

(51) Int. Cl.
*G06F 15/16* (2006.01)
*H04W 76/14* (2018.01)
(Continued)

(52) U.S. Cl.
CPC .......... *H04W 76/14* (2018.02); *H04W 8/005* (2013.01); *G06K 7/10722* (2013.01);
(Continued)

(58) Field of Classification Search
CPC ...... H04W 4/80; H04W 12/003; H04W 12/06
See application file for complete search history.

(56) References Cited

U.S. PATENT DOCUMENTS

2012/0310746 A1* 12/2012 Zhao ...................... G06Q 30/02
                                                                    705/14.66
2013/0221094 A1* 8/2013 Smith ................ G07C 9/00309
                                                                    235/382
(Continued)

FOREIGN PATENT DOCUMENTS

CN        102983890 A       3/2013
CN        104519485 A       4/2015
(Continued)

OTHER PUBLICATIONS

International Search Report dated Mar. 10, 2017 from the International Bureau in counterpart International application No. PCT/CN2017/072868.
(Continued)

*Primary Examiner* — Hieu T Hoang
(74) *Attorney, Agent, or Firm* — Sughrue Mion, PLLC

(57) ABSTRACT

A communications device connection method, a terminal device, and a server system are provided. The method includes: acquiring an image identifier of a communications device, sending the image identifier to a server side, and receiving characteristic information of at least one dimension for a device type of the communications device; detecting connection information sent by at least one communications device, obtaining a device identifier of the at least one communications device, and obtaining to-be-matched
(Continued)

characteristic information of at least one dimension for a type of the registered at least one communications device; comparing the characteristic information of the at least one dimension for the device type of the communications device with the to-be-matched characteristic information of the at least one dimension for the type of the registered at least one communications device; and binding to and establishing a communications connection to a selected target communications device.

20 Claims, 9 Drawing Sheets

(51) Int. Cl.
| | |
|---|---|
| *H04W 8/00* | (2009.01) |
| *H04W 4/21* | (2018.01) |
| *H04W 76/11* | (2018.01) |
| *H04W 4/80* | (2018.01) |
| *H04L 29/08* | (2006.01) |
| *H04W 12/06* | (2009.01) |
| *H04W 12/00* | (2009.01) |
| *G06K 7/10* | (2006.01) |
| *G06K 7/14* | (2006.01) |

(52) U.S. Cl.
CPC .......... *G06K 7/1417* (2013.01); *H04L 67/303* (2013.01); *H04W 4/21* (2018.02); *H04W 4/80* (2018.02); *H04W 12/003* (2019.01); *H04W 12/06* (2013.01); *H04W 76/11* (2018.02)

(56) References Cited

U.S. PATENT DOCUMENTS

| | | | | |
|---|---|---|---|---|
| 2013/0247117 | A1* | 9/2013 | Yamada | G08C 17/02 725/93 |
| 2014/0006784 | A1* | 1/2014 | Walker | H04L 9/3273 713/169 |
| 2014/0007211 | A1 | 1/2014 | Yang et al. | |
| 2014/0310612 | A1* | 10/2014 | Lu | G06F 3/04842 715/748 |
| 2014/0369232 | A1* | 12/2014 | Kim | H04W 60/00 370/254 |
| 2015/0072653 | A1 | 3/2015 | Fan et al. | |
| 2015/0141005 | A1* | 5/2015 | Suryavanshi | H04L 67/125 455/434 |
| 2015/0286670 | A1 | 10/2015 | Hall et al. | |
| 2015/0296251 | A1* | 10/2015 | Xu | H04W 12/04 725/31 |
| 2016/0021538 | A1 | 1/2016 | Conant et al. | |
| 2016/0112980 | A1* | 4/2016 | Pai | H04W 12/08 455/435.1 |
| 2016/0191780 | A1* | 6/2016 | Li | H04N 5/77 348/211.3 |
| 2016/0308858 | A1* | 10/2016 | Nordstrom | H04L 63/068 |
| 2016/0371683 | A1* | 12/2016 | Maus | G06Q 20/3829 |
| 2018/0015218 | A1* | 1/2018 | Welsch | A61M 5/172 |

FOREIGN PATENT DOCUMENTS

| | | |
|---|---|---|
| CN | 104618622 A | 5/2015 |
| CN | 104636654 A | 5/2015 |
| CN | 104820643 A | 8/2015 |
| CN | 105093948 A | 11/2015 |
| CN | 105242550 A | 1/2016 |
| CN | 105242644 A | 1/2016 |
| CN | 105722012 A | 6/2016 |
| EP | 2 381 658 A1 | 10/2011 |
| JP | 2014060627 A | 4/2014 |
| JP | 2014179884 A | 9/2014 |
| JP | 2015211241 A | 11/2015 |

OTHER PUBLICATIONS

International Search Report of PCT/CN2017/072868 dated Mar. 29, 2017.
Communication dated Mar. 11, 2019 from the Korean Patent Office in application No. 10-2018-7011078.
Communication dated Mar. 11, 2020, from the State Intellectual Property Office of the P.R. of China in Application No. 201610073994.9.
Office Action dated Jun. 8, 2020 in Indian Application No. 201837010836.
Written Opinion of the International Searching Authority dated Mar. 29, 2017 in International Application No. PCT/CN2017/072868.
Communication dated Feb. 19, 2019 from the Japanese Patent Office in application No. 2018-519701.

* cited by examiner

COMMUNICATIONS DEVICE CONNECTION METHOD, TERMINAL DEVICE, AND SERVER SYSTEM

RELATED APPLICATION

This application is a National Stage of International Application No. PCT/CN2017/072868, filed on Feb. 3, 2017, which claims priority to Chinese Patent Application No. 201610073994.9, entitled "COMMUNICATIONS DEVICE CONNECTION METHOD, TERMINAL DEVICE, AND SERVER SYSTEM", filed on Feb. 2, 2016 in the State Intellectual Property Office, which is incorporated herein by reference in its entirety.

FIELD

Apparatuses, methods, and devices consistent with the present disclosure relate device connection processing technologies, and specifically, to a communications device connection method, a terminal device, and a server system.

DESCRIPTION OF RELATED ART

In the existing technology, an image identifier such as a two-dimensional code is scanned, so that a terminal device is connected to a communications device. The two-dimensional code includes information about the communications device (a unique identifier of the communications device). When a user scans the two-dimensional code, a server can accurately locate, according to information in the two-dimensional code, the communications device uniquely corresponding to it, and then establish a direct relationship between the user and the communications device. Specifically, in the foregoing solution, the communications device needs to be manufactured in a one-to-one correspondence with the two-dimensional code. For example, during manufacturing of a communications device A, information about the communications device A, for example, a unique identifier of the device, first needs to be made in a one-to-one correspondence with the communications device A. When pasting a two-dimensional code, an operator needs to generate, on the server, a corresponding two-dimensional code B according to the information about the communications device A, print the two-dimensional code B, and then paste the two-dimensional code B on the communications device A.

However, the foregoing solution has the following problem: Before the two-dimensional code is printed, different two-dimensional codes need to be generated on the server in batches, and a particular two-dimensional code may not be successfully generated in this process, reducing production efficiency of a production line. Before pasting the two-dimensional code, the operator first needs to make the two-dimensional codes in a one-to-one correspondence with devices. This process increases production costs, has a high fault possibility, and reduces the production efficiency.

SUMMARY

According to one or more exemplary embodiments, there are provided a communications device connection method, a terminal device, and a server system, to resolve at least the technical problem in the conventional art.

To achieve the foregoing objective, the technical solutions of the present disclosure are implemented as follows:

According to one or more exemplary embodiments, there are provided a communications device connection method, applied to a terminal device, and the method including:

acquiring an image identifier of a communications device, sending the image identifier to a server side, and receiving characteristic information of at least one dimension for a device type of the communications device, the characteristic information being returned by the server side based on the image identifier;

detecting connection information sent by at least one communications device, obtaining a device identifier of the at least one communications device by parsing the connection information, and obtaining to-be-matched characteristic information of at least one dimension for a type of the registered at least one communications device from the server side based on the device identifier;

comparing the characteristic information of the at least one dimension for the device type of the communications device with the to-be-matched characteristic information of the at least one dimension for the type of the registered at least one communications device, and selecting a target communications device from the at least one communications device based on a comparison result; and binding to and establishing a communications connection to the target communications device.

According to one or more exemplary embodiments, there is provided a communications device connection method, applied to a server, and the method including:

obtaining characteristic information of at least one dimension for a type of a registered communications device;

receiving an image identifier sent by a terminal device, obtaining characteristic information of at least one dimension for a type of a communications device based on the image identifier, and sending the characteristic information of the at least one dimension for the type of the communications device to the terminal device; and receiving number information of the communications device sent by the terminal device, obtaining to-be-matched characteristic information of at least one communications device based on the number information, and sending the to-be-matched characteristic information to the terminal device, so that the terminal device obtains a target communications device from the at least one communications device by means of screening based on the characteristic information of the at least one dimension for the type of the communications device and the to-be-matched characteristic information of the at least one communications device, and binds to and establishes a connection to the target communications device obtained by the screening.

According to one or more exemplary embodiments, there is provided a terminal device, the terminal device including:

an acquisition unit configured to acquire an image identifier of a communications device;

a first communications unit configured to: send the image identifier to a server side, and receive characteristic information of at least one dimension for a device type of the communications device, the characteristic information being returned by the server side based on the image identifier;

a second communications unit configured to: detect connection information sent by at least one communications device, and bind to and establish a communications connection to a target communications device; and a processing unit configured to: obtain a device identifier of the at least one communications device by parsing the connection information, and obtain to-be-matched characteristic information of at least one dimension for a type of the registered at least one communications device from the server side based on the device identifier; and compare the characteristic information of the at least one dimension for the device type of the communications device with the to-be-matched characteristic information of the at least one dimension for the type of the registered at least one communications device, and select the target communications device from the at least one communications device based on a comparison result.

According to one or more exemplary embodiments, there is provided a server system, the server system including:

a communications device server configured to register characteristic information of at least one dimension for a type of a communications device with a social network server; and the social network server configured to: receive an image identifier sent by a terminal device; receive number information of a communications device sent by the terminal device; obtain characteristic information of at least one dimension for a type of a communications device based on the image identifier, and send the characteristic information of the at least one dimension for the type of the communications device to the terminal device; and obtain to-be-matched characteristic information of at least one communications device based on the number information, and send the to-be-matched characteristic information to the terminal device.

According to a communications device connection method, a terminal device, and a server system provided by the present disclosure, the terminal device can acquire an image identifier, and obtain, based on the image identifier, characteristic information of at least one dimension for a type corresponding to a communications device from a server side; after receiving connection information sent by at least one communications device, obtain to-be-matched characteristic information from a server according to identifier information of the communications device; and select a target communications device by comparing the two groups of characteristic information, and establish a connection to the target communications device. In this way, a corresponding image identifier is set for a type of a communications device, and a terminal device can establish a connection to the communications device only by scanning the image identifier corresponding to the type of the communications device, thereby preventing such problems in the conventional art as incapability of increasing production efficiency and excessively high production costs caused by the fact that an image identifier needs to be set for each communications device.

BRIEF DESCRIPTION OF THE DRAWINGS

The above and other aspects will become apparent from the following description of exemplary embodiments, with reference to the accompanying drawings in which.

DESCRIPTION OF EXEMPLARY EMBODIMENTS

The following further describes the present disclosure in detail with reference to the accompanying drawings and specific embodiments. It should be understood that specific embodiments described herein are merely intended to explain the present disclosure instead of limiting the present disclosure.

Embodiment 1

Figure 1:
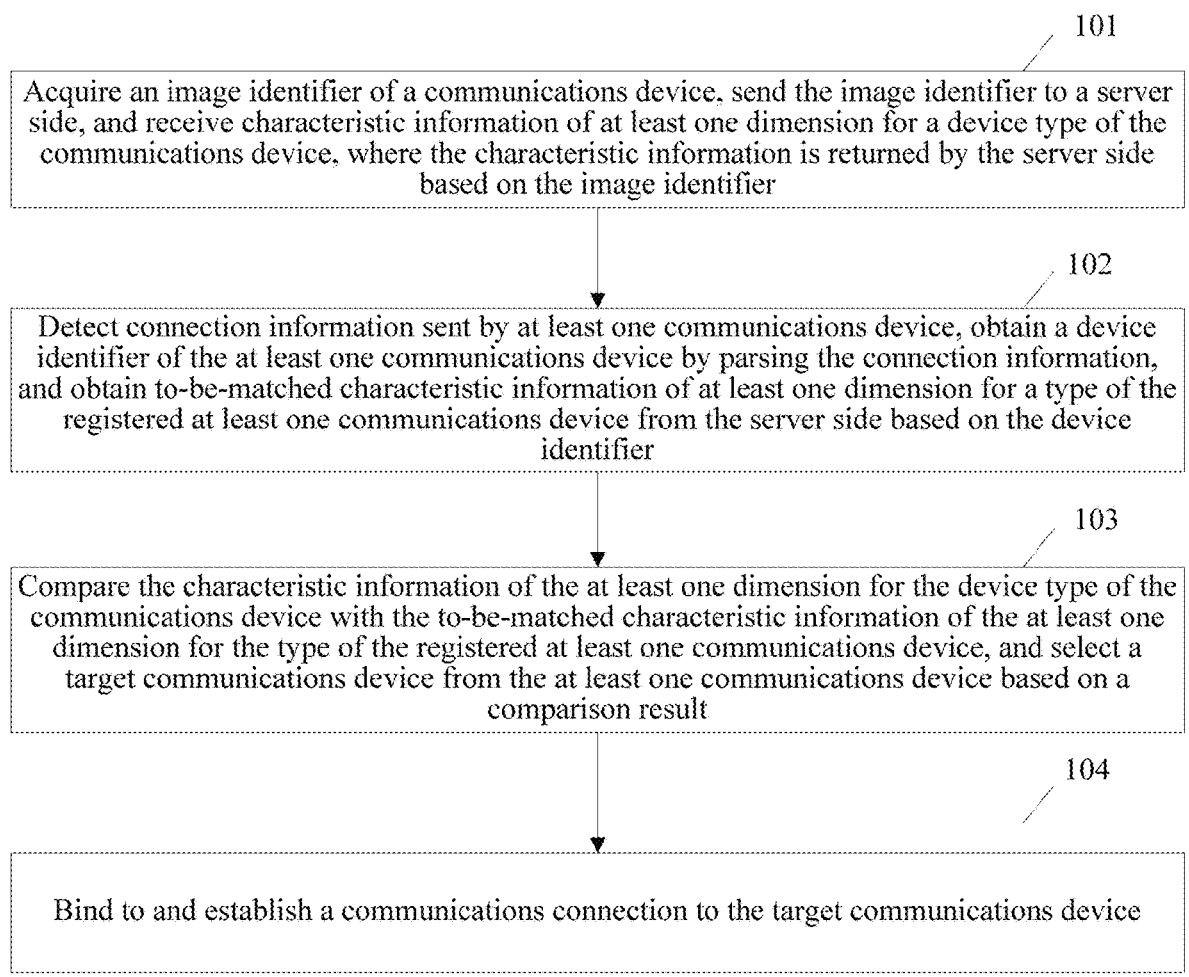
FIG. 1 is a schematic flowchart 1 of a communications device connection method according to an exemplary embodiment.

According to one or more exemplary embodiments, there is provided a communications device connection method, applied to a terminal device. As shown in FIG. 1, the method includes:

Step 101: Acquire an image identifier of a communications device, send the image identifier to a server side, and receive characteristic information of at least one dimension for a device type of the communications device, where the characteristic information is returned by the server side based on the image identifier.

Step 102: Detect connection information sent by at least e communications device, obtain a device identifier of the at least one communications device by parsing the connection information, and obtain to-be-matched characteristic information of at least one dimension for a type of the registered at least one communications device from the server side based on the device identifier.

Step 103: Compare the characteristic information of the at least one dimension for the device type of the communications device with the to-be-matched characteristic information of the at least one dimension for the type of the registered at least one communications device, and select a target communications device from the at least one communications device based on a comparison result.

Step 104: Bind to and establish a communications connection to the target communications device.

Herein, the terminal device may be a device such as a mobile phone or a tablet computer. The communications device may be a Bluetooth communications device, or a communications device on a wireless local area network.

The image identifier may be a two-dimensional code that is set on the communications device, or may be a type number of the communications device.

According to one or more exemplary embodiments, the acquiring an image identifier may be performed by using an image acquisition unit of the terminal device, for example, may be performed by a camera.

According to one or more exemplary embodiments, the communications device is a communications device having a Bluetooth communication function:

The characteristic information of the at least one dimension for the device type of the communications device includes at least one of the following: type identifier information of the communications device, a communication mode supported by the communications device, and official account information.

The type identifier information of the communications device is identifier information for a type of the communications device. According to one or more exemplary embodiments, the communications device further needs to register with the server side, including recording all of the type identifier information of the communications device, the communication mode supported by the communications device, and the official account information on the server side.

The detecting connection information sent by at least one communications device may include: when the communication mode supported by the communications device is Bluetooth communication, directly detecting, by the terminal device, whether at least one piece of connection information is received in a Bluetooth communication mode.

It should be noted that the Bluetooth communications device can directly initiate connection information including broadcast information, without requiring the terminal device to send a connection request.

When the communications device is a Bluetooth communications device, the sent connection information may include at least a MAC address of the communications device. In addition, the connection information may further include official account information and device identifier information of the communications device. The device identifier information is a device identifier that uniquely corresponds to each communications device.

In the to-be-matched characteristic information of the at least one dimension, the at least one dimension may be the same as the foregoing at least one dimension.

Further, the comparing the characteristic information of the at least one dimension for the device type of the communications device with the to-be-matched characteristic information of the at least one dimension for the type of the registered at least one communications device may be: using the characteristic information of the at least one dimension for the device type of the communications device as a screening criterion, screening the to-be-matched characteristic information of the registered at least one communications device based on the screening criterion, and selecting a target communications device that matches the screening criterion.

The binding to the target communications device includes: generating a binding request based on a device identifier of the target communications device, and sending the binding request to the server side, so that the server side associates the target communications device with the terminal device based on the device identifier in the binding request. The binding request may specifically include the device identifier of the target communications device and a device identifier of the terminal device, and then, the device identifiers of the two devices may be associated with each other on the server side, thereby completing the binding.

According to one or more exemplary embodiments, there is further provided an operation scenario of binding to the communications device based on an application, specifically:

Before the acquiring an image identifier, the method further includes: logging in to the server side based on a first account corresponding to a first application, where the first application may be social software, and the first account may be an account registered by a user with a side of the first application, and includes at least a user name.

Correspondingly, the binding to and establishing a communications connection to the communications device includes: generating a binding request based on a device identifier of the communications device and the first account of the first application, and sending the binding request to the server side, so that the server side associates the device identifier of the communications device with the first account based on the binding request to form the communications connection, where the communications connection supports communication with the communications device based on the first account of the first application.

Figure 2:
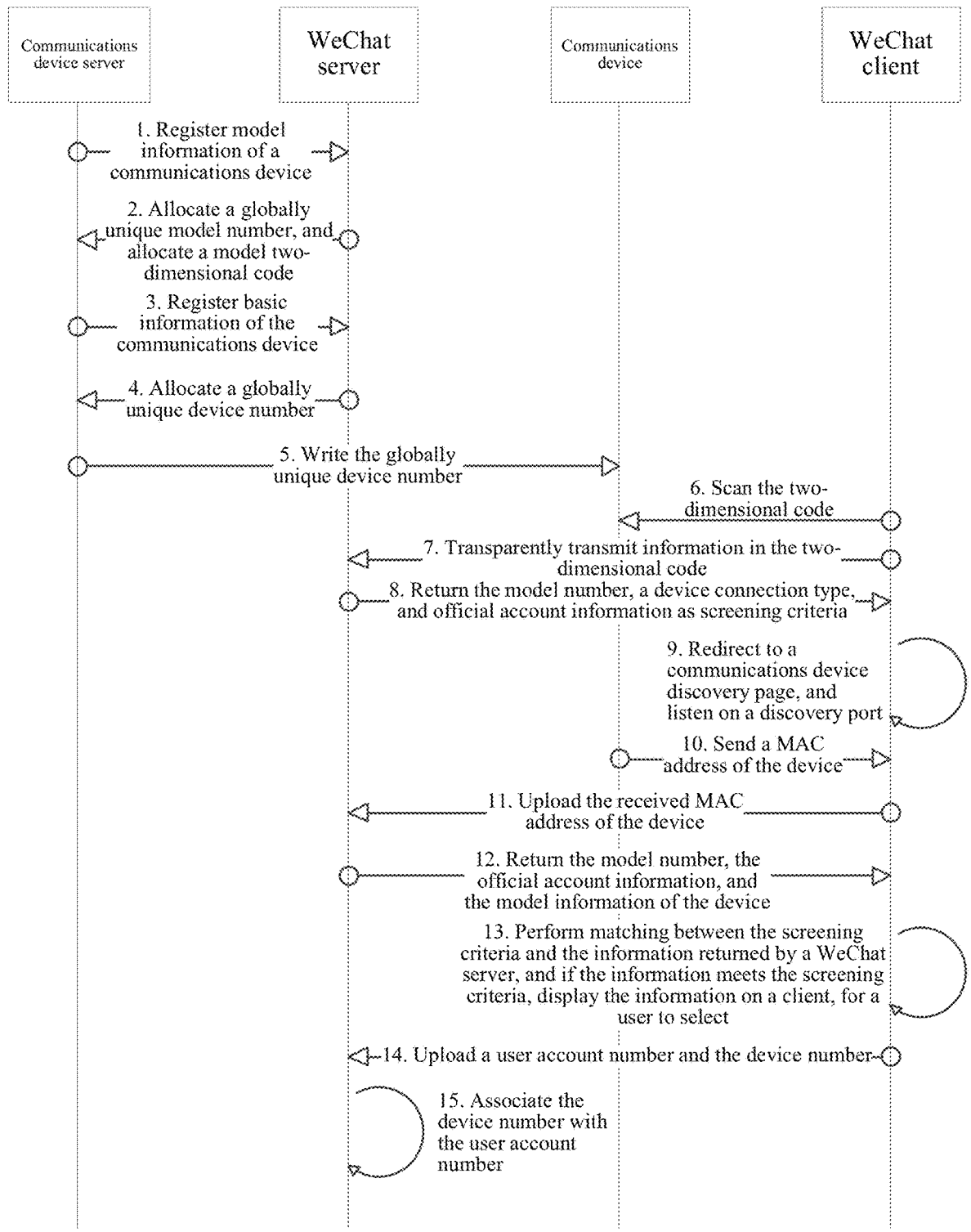
FIG. 2 is a schematic processing flowchart 1 according to an exemplary embodiment.

FIG. 2 is a schematic processing flowchart according to an exemplary embodiment. A scenario of connecting to the Bluetooth communications device is specifically described with reference to FIG. 2, and may include the following constituent parts: a terminal device (mobile phone), a communications device (Bluetooth), social software, a social software background, and a communications device background. According to one or more exemplary embodiments, the terminal device is a mobile phone, and the social software is WeChat.

After the communications device registers information about the communications device with a social software background server by using a communications device server, the social software can discover and add a nearby Bluetooth device and a nearby Wi-Fi communications device on a current local area network by scanning two-dimensional codes.

The communications device server registers characteristic information of at least one dimension for a device type of the communications device with a WeChat server. The characteristic information may be product information (Product_Info). The product information may include a device model, name, and icon, a communication mode (Bluetooth or Wi-Fi) that is supported by the communications device, official account information (device type), and the like.

The WeChat server allocates a globally unique type identifier (product ID) and two-dimensional code information to a model of each registered communications device. The two-dimensional code information includes at least a type identifier (product ID) of the communications device, a connection type (Bluetooth or Wi-Fi) of the communications device, and official account information (device type).

The communications device registers basic information (device info), including a type identifier (product ID), of the communications device with the social software background by using the communications device server to obtain a globally unique device identifier (device ID) that is allocated by the WeChat server to each device.

After scanning a two-dimensional code of a communications device by using a social software client installed in a terminal device, for example, a WeChat client, a user A transparently transmits information in the two-dimensional code to the social software background. After parsing the information in the two-dimensional code, the social software background returns a type identifier (product ID) of the device, a connection type (Bluetooth or Wi-Fi) of the device, and official account information (device type) to the social software client on the terminal device as screening criteria.

The social software client redirects to a corresponding communications device discovery page according to received information returned by the WeChat server. When the connection type of the device is Bluetooth, the WeChat client begins to listen on a discovery port.

The Bluetooth communications device broadcasts a MAC address of the device.

After receiving the MAC address broadcast by the Bluetooth communications device, or a device response packet or a device online notification packet that is sent by the Bluetooth communications device, and obtaining official account information (device type) and a device identifier (device ID) by means of parsing, the WeChat client uploads the information to the WeChat server, searches for a type identifier (product ID) of the device, and compares the type identifier with a screening criterion. When the screening criterion is met, that is, the type identifier (product ID) is consistent, the WeChat client displays model information (Product_Info) of the communications device.

After the user clicks a communications device and clicks "Bind", the WeChat client uploads a WeChat account number (user ID) and a current device identifier (device ID) of the user to the WeChat server for association, indicating that the user successfully adds the communications device.

It can be seen that, by means of the foregoing solution, a terminal device can acquire an image identifier, and obtain, based on the image identifier, characteristic information of at least one dimension for a type corresponding to a communications device from a server side; after receiving connection information sent by at least one communications device, obtain to-be-matched characteristic information from a server according to identifier information of the communications device; and select a target communications device by comparing the two groups of characteristic information, and establish a connection to the target communications device. In this way, a corresponding image identifier is set for a type of a communications device, and a terminal device can establish a connection to the communications device only by scanning the image identifier corresponding to the type of the communications device, thereby preventing such problems in the conventional art as incapability of increasing production efficiency and excessively high production costs caused by the fact that an image identifier needs to be set for each communications device.

In addition, because the communications device is added by scanning the corresponding image identifier set for the type of the communications device, it is not necessary to worry about a problem that the communications device of this type cannot be added after the image identifier is lost. Moreover, when a user scans an image identifier to add a communications device, only a nearby hardware device within a communication distance range can be added, thoroughly resolving a problem of remotely adding a device by a stranger.

Embodiment 2

According to one or more exemplary embodiments, there is provided a communications device connection method, applied to a terminal device. As shown in FIG. 1, the method includes:

Step 101: Acquire an image identifier of a communications device, send the image identifier to a server side, and receive characteristic information of at least one dimension for a device type of the communications device, where the characteristic information is returned by the server side based on the image identifier.

Step 102: Detect connection information sent by at least one communications device, obtain a device identifier of the at least one communications device by parsing the connection information, and obtain to-be-matched characteristic information of at least one dimension for a type of the registered at least one communications device from the server side based on the device identifier.

Step 103: Compare the characteristic information of the at least one dimension for the device type of the communications device with the to-be-matched characteristic information of the at least one dimension for the type of the registered at least one communications device, and select a target communications device from the at least one communications device based on a comparison result.

Step 104: Bind to and establish a communications connection to the target communications device.

Herein, the terminal device may be a device such as a mobile phone or a tablet computer. The communications device may be a Bluetooth communications device, or a Wi-Fi communications device on a wireless local area network.

The image identifier may be a two-dimensional code that is set on the communications device, or may be a type number of the communications device.

According to one or more exemplary embodiments, the acquiring an image identifier may be performed by using an image acquisition unit of the terminal device, for example, may be performed by a camera.

According to one or more exemplary embodiments, the following descriptions are provided by using an example in which the communications device is a communications device having a Wi-Fi communication function:

The characteristic information of the at least one dimension for the device type of the communications device includes at least one of the following: type identifier information of the communications device, a communication mode supported by the communications device, and official account information.

The type identifier information of the communications device is identifier information for a type of the communications device. According to one or more exemplary embodiments, the communications device further needs to register with the server side, including recording all of the type identifier information of the communications device, the communication mode supported by the communications device, and the official account information on the server side.

Before the detecting connection information sent by at least one communications device, the method further includes:

obtaining a communication mode supported by the communications device corresponding to the image identifier from the server side; and sending a connection request based on the communication mode supported by the communications device.

The detecting connection information sent by at least one communications device may include: when the communication mode supported by the communications device is wireless communication, listening, by the terminal device, on a wireless communication port, and determining whether a response packet sent by the communications device is received.

The connection information may further include official account information and device identifier information of the communications device. The device identifier information is a device identifier that uniquely corresponds to each communications device.

In the to-be-matched characteristic information of the at least one dimension, the at least one dimension may be the same as the foregoing at least one dimension.

Further, the comparing the characteristic information of the at least one dimension for the device type of the communications device with the to-be-matched characteristic information of the at least one dimension for the type of the registered at least one communications device may be: using the characteristic information of the at least one dimension for the device type of the communications device as a screening criterion, screening the to-be-matched characteristic information of the registered at least one communications device based on the screening criterion, and selecting a target communications device that matches the screening criterion.

The binding to the target communications device includes: generating a binding request based on a device identifier of the target communications device, and sending the binding request to the server side, so that the server side associates the target communications device with the terminal device based on the device identifier in the binding request. The binding request may specifically include the device identifier of the target communications device and a device identifier of the terminal device, and then, the device identifiers of the two devices may be associated with each other on the server side, thereby completing the binding.

According to one or more exemplary embodiments, there are further provided an operation scenario of binding to the communications device based on an application, specifically:

Before the acquiring an image identifier, the method further includes: logging in to the server side based on a first account corresponding to a first application, where the first application may be social software, and the first account may be an account registered by a user with a side of the first application, and includes at least a user name.

Correspondingly, the binding to and establishing a communications connection to the communications device includes: generating a binding request based on a device identifier of the communications device and the first account of the first application, and sending the binding request to the server side, so that the server side associates the device identifier of the communications device with the first account based on the binding request to form the communications connection, where the communications connection supports communication with the communications device based on the first account of the first application.

Figure 3:
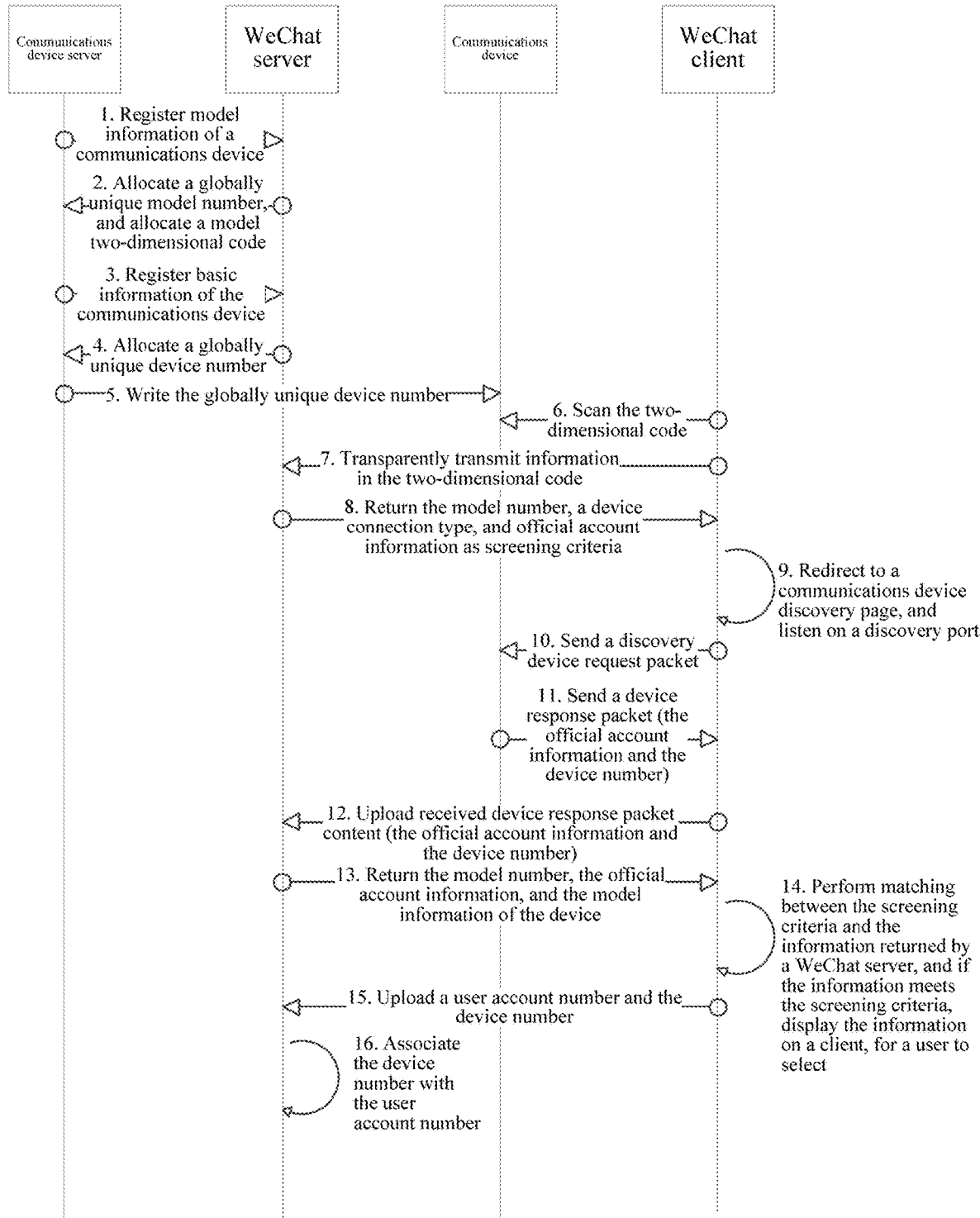
FIG. 3 is a schematic processing flowchart 2 according to another exemplary embodiment.
Figure 4:
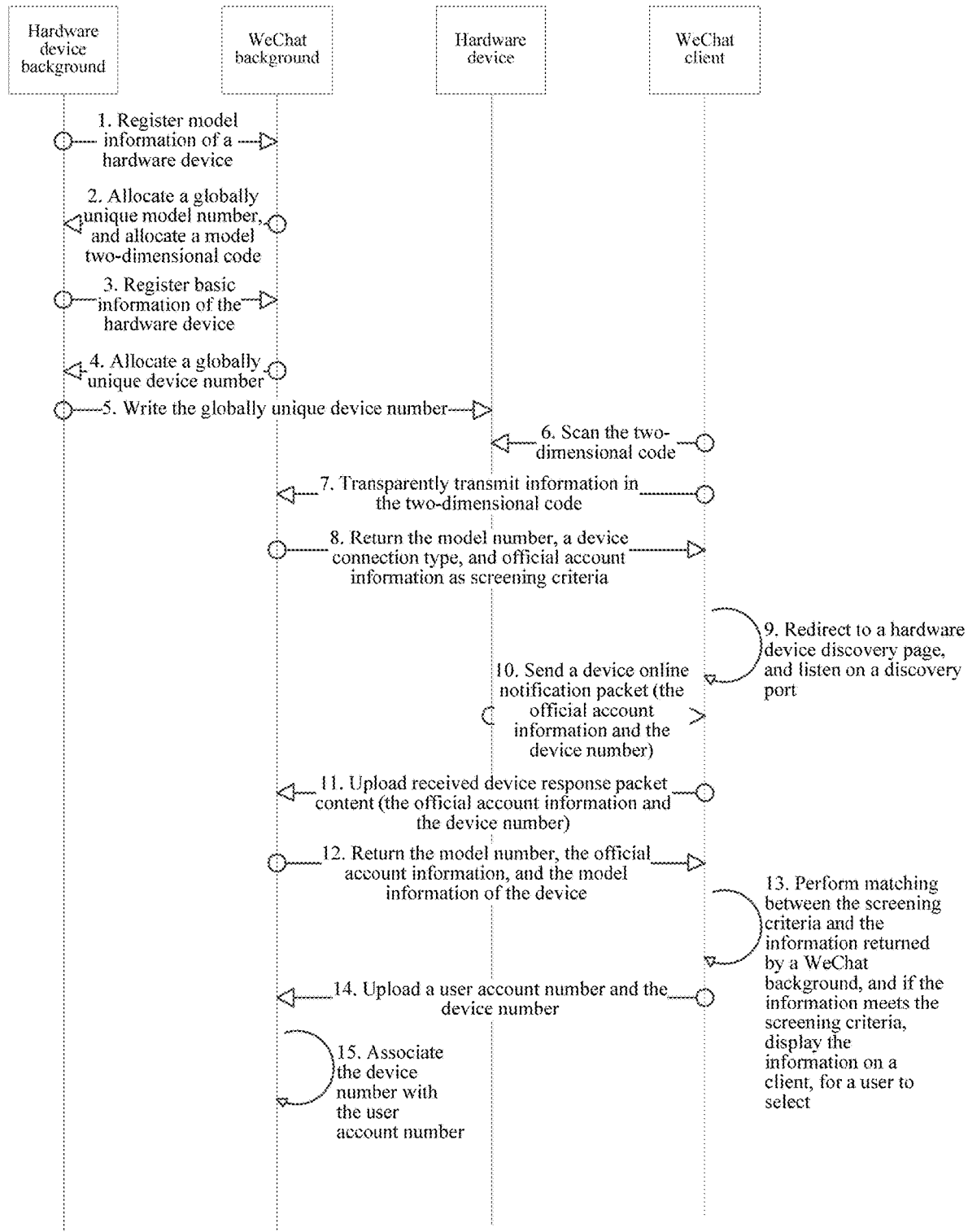
FIG. 4 is a schematic processing flowchart 3 according to another exemplary embodiment.

In the following, a scenario of connecting to the Wi-Fi communications device is specifically described with reference to FIG. 3 and FIG. 4, and may include the following constituent parts: a terminal device (mobile phone), a communications device Wi-Fi), social software, a social software background, and a communications device background. In a non-limiting example, the terminal device is a mobile phone, and the social software is WeChat.

After the communications device registers information about the communications device with a social software background server by using a communications device server, the social software can discover and add a nearby Wi-Fi communications device on a current local area network by scanning a two-dimensional code.

The communications device server registers characteristic information of at least one dimension for a device type of the communications device with a WeChat server. The characteristic information may be product information (Product_Info). The product information may include a device model, name, and icon, a communication mode (Bluetooth or Wi-Fi) that is supported by the communications device, official account information (device type), and the like.

The WeChat server allocates globally unique type identifier (product ID) and two-dimensional code information to a model of each registered communications device. The two-dimensional code information includes at least a type identifier (product ID) of the communications device, a connection type (Bluetooth or Wi-Fi) of the communications device, and official account information (device type).

The communications device registers basic information (device info), including a type identifier (product ID), of the communications device with the social software background by using the communications device server to obtain a globally unique device identifier (device ID) that is allocated by the WeChat server to each device.

After scanning a two-dimensional code of a communications device by using a social software client installed in a terminal device, for example, a WeChat client, a user A transparently transmits information in the two-dimensional code to the social software background. After parsing the information in the two-dimensional code, the social software background returns a type identifier (product ID) of the device, a connection type (Bluetooth or Wi-Fi) of the device, and official account information (device type) to the social software client on the terminal device as screening criteria.

The social software client redirects to a corresponding communications device discovery page according to received information returned by the WeChat server. When the connection type of the device is Wi-Fi, the WeChat client begins to broadcast a device discovery request packet, and listens on a discovery port; or may listen on a port, as shown in FIG. 4.

After connecting to the Internet, a Wi-Fi device may broadcast a device online notification packet, including official account information (device type) and a device identifier (device ID); or after receiving the device discovery request packet sent by the social software client, a Wi-Fi device may send a device discovery response packet, including official account information (device type) and a device identifier (device ID). The Wi-Fi device continuously broadcasts the online notification packet. By adding the official account information and device identifier information to the online notification packet, the Wi-Fi device enables the WeChat client to discover a device in time, thereby further ensuring user experience.

After receiving a device response packet or a device online notification packet that is sent by the Wi-Fi communications device, and obtaining official account information (device type) and a device identifier (device ID) by means of parsing, the WeChat client uploads the information to the WeChat server, searches for a type identifier (product ID) of the device, and compares the type identifier with a screening criterion. When the screening criterion is met, that is, the type identifier (product ID) is consistent, the WeChat client displays model information (Product_Info) of the communications device.

After the user clicks a communications device and clicks "Bind", the WeChat client uploads a WeChat account number (user ID) and a current device identifier (device ID) of the user to the WeChat server for association, indicating that the user successfully adds the communications device.

According to one or more exemplary embodiments, there is further provided an operation of selecting a target communications device from matched communications devices, including:

determining, based on the comparison result, a communications device matching the characteristic information of the at least one dimension;

obtaining signal strength information between the communications device and the terminal device; and selecting the target communications device from the communications device based on the signal strength information.

The signal strength information may be determined by the terminal device according to the received connection information sent by the communications device.

According to an implementation method for discovering and adding a communications device by scanning a two-dimensional code, a side of the terminal device mainly has the following functions:

The terminal device can discover a nearby Bluetooth communications device by scanning a two-dimensional code.

The terminal device can discover, by scanning a two-dimensional code, a Wi-Fi communications device within a local area network on which the terminal device is currently located.

The terminal device can add a nearby Bluetooth communications device by scanning a two-dimensional code.

The terminal device can add, by scanning a two-dimensional code, a Wi-Fi communications device within a local area network on which the terminal device is currently located.

The terminal device can configure, by scanning a two-dimensional code, a Wi-Fi communications device, and an SSID and a password of a local area network on which the terminal device is currently located.

Figure 5:
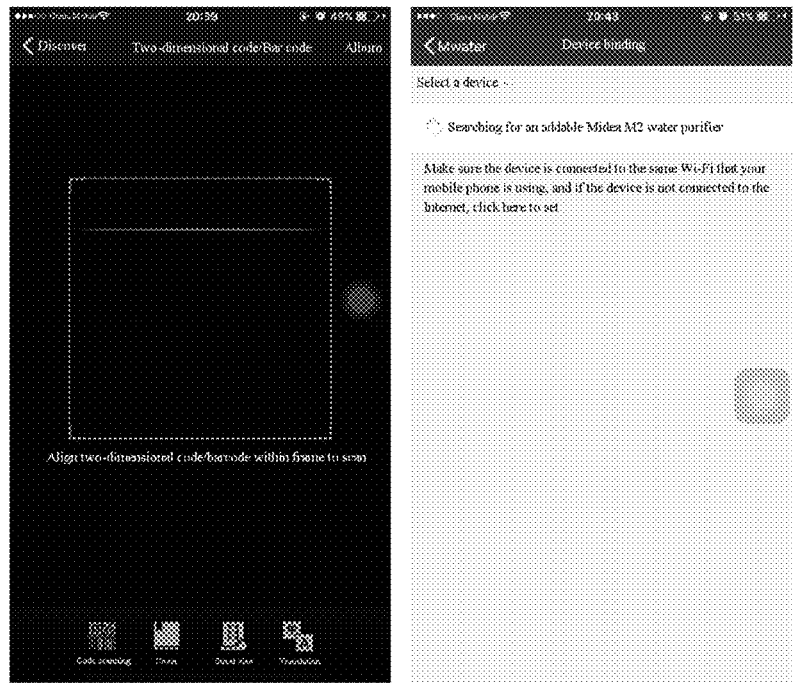
FIG. 5 is a schematic diagram 1 of an operation interface according to an exemplary embodiment.

According to one or more exemplary embodiments, an operation interface of a side of the terminal device may be as follows: When a two-dimensional code is scanned, to enter a communications device discovery page, and a name of a communications device in discovery is displayed, referring to FIG. 5.

Figure 6:
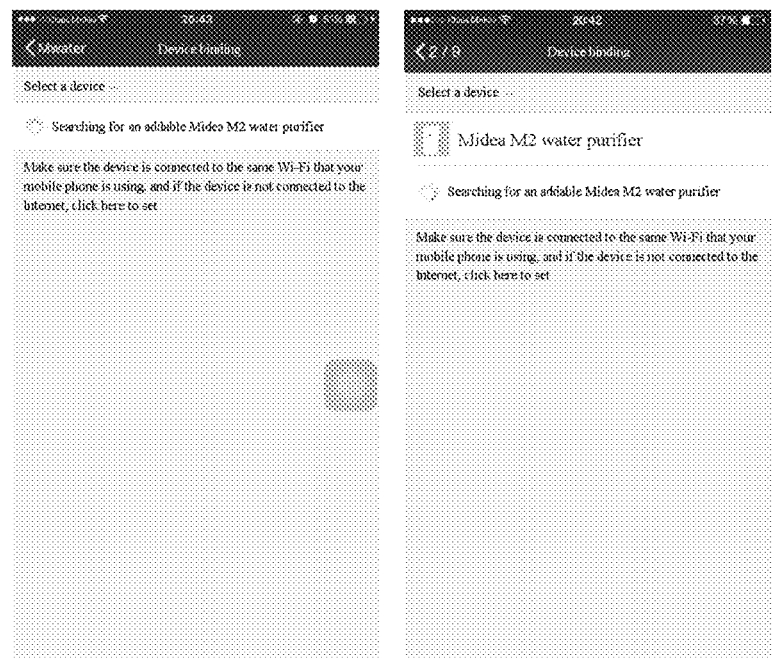
FIG. 6 is a schematic diagram 2 of an operation interface according to another exemplary embodiment.

A nearby Bluetooth device or a nearby communications device on a local area network is discovered, and a logo and a name of the communications device of this model are displayed, referring to FIG. 6.

Figure 7:
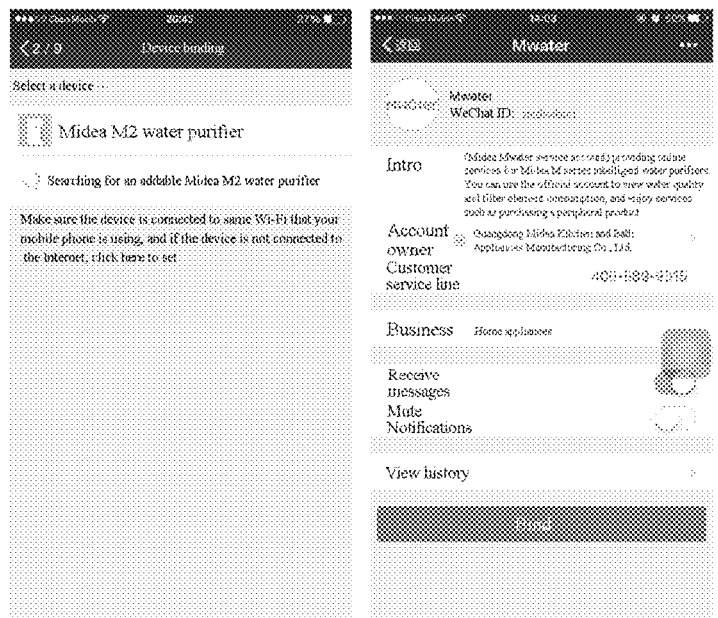
FIG. 7 is a schematic diagram 3 of an operation interface according to another exemplary embodiment.

The discovered communications device is clicked, to redirect to a communications device information display page. The communications device is added by clicking "Bind", referring to FIG. 7.

Figure 8:
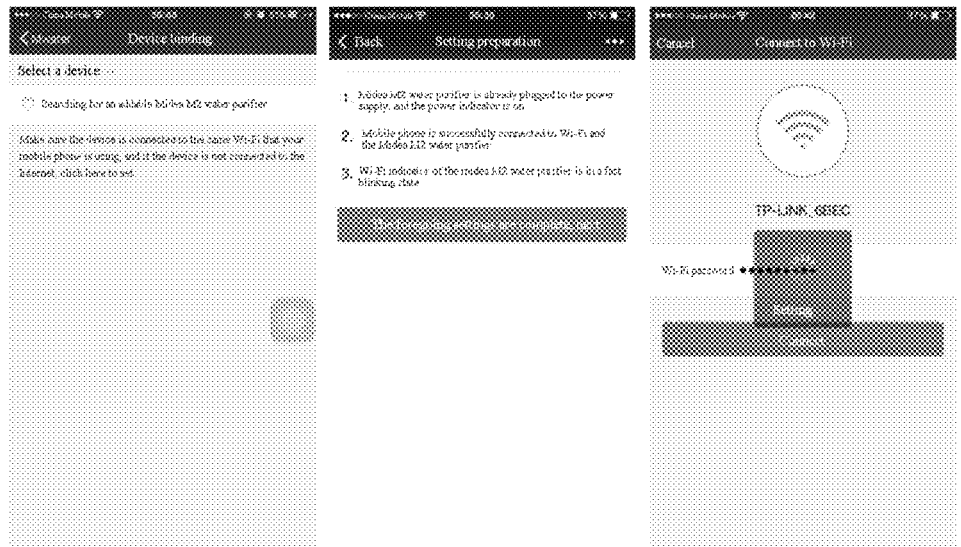
FIG. 8 is a schematic diagram 4 of an operation interface according to another exemplary embodiment.

"Click to set" on the device discovery page is clicked, to redirect to a Wi-Fi device setting preparation page, displaying steps before network setting. "The foregoing settings are complete, next" is clicked, to redirect to the Wi-Fi network SSID and password setting page. "Connect" is clicked to perform network configuration on the Wi-Fi device, referring to FIG. 8.

It can be seen that, by means of the foregoing solution, a terminal device can acquire an image identifier, and obtain, based on the image identifier, characteristic information of at least one dimension for a type corresponding to a communications device from a server side; then, after receiving connection information sent by at least one communications device, obtain to-be-matched characteristic information from a server according to identifier information of the communications device; and select a target communications device by comparing the two groups of characteristic information, and establish a connection to the target communications device. In this way, a corresponding image identifier is set for a type of a communications device, and a terminal device can establish a connection to the communications device only by scanning the image identifier corresponding to the type of the communications device, thereby preventing such problems in the conventional art as incapability of increasing production efficiency and excessively high production costs caused by the fact that an image identifier needs to be set for each communications device.

In addition, because the communications device is added by scanning the corresponding image identifier set for the type of the communications device, it is not necessary to worry about a problem that the communications device of this type cannot be added after the image identifier is lost. Moreover, when a user scans an image identifier to add a communications device, only a nearby hardware device within a communication distance range can be added, thoroughly resolving a problem of remotely adding a device by a stranger.

Embodiment 3

Figure 9:
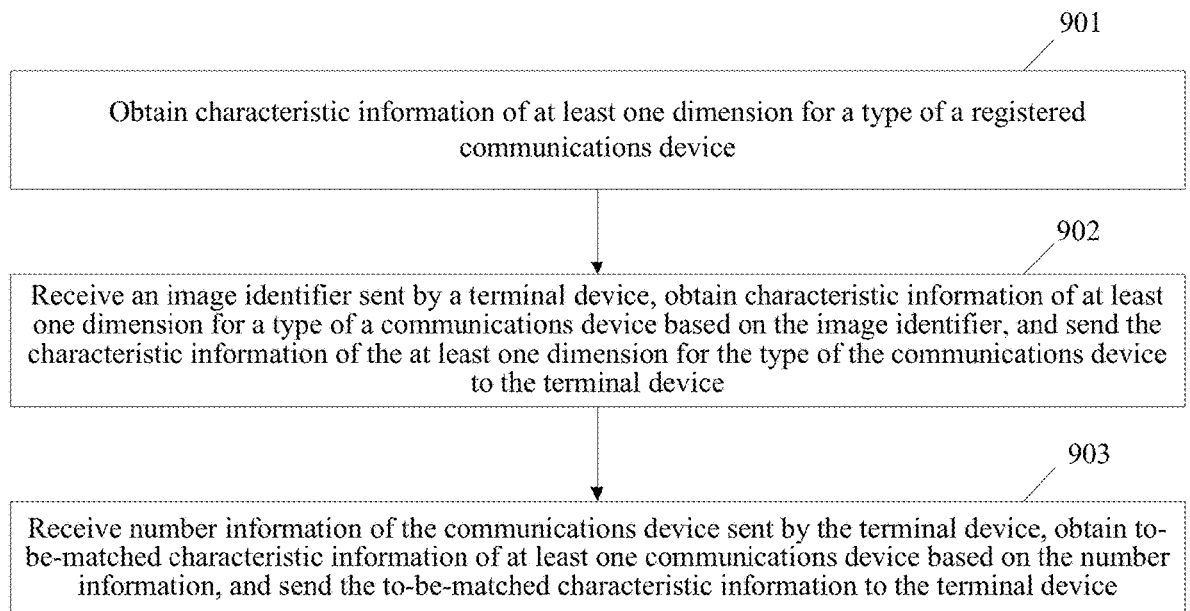
FIG. 9 is a schematic flowchart 2 of a communications device connection method according to an exemplary embodiment.

According to one or more exemplary embodiments, there is provided a communications device connection method, as shown in FIG. 9, applied to a server, and the method including:

Step 901: Obtain characteristic information of at least one dimension for a type of a registered communications device.

Step 902: Receive an image identifier sent by a terminal device, obtain characteristic information of at least one dimension for a type of a communications device based on the image identifier, and send the characteristic information of the at least one dimension for the type of the communications device to the terminal device.

Step 903: Receive number information of the communications device sent by the terminal device, obtain to-be-matched characteristic information of at least one communications device based on the number information, and send the to-be-matched characteristic information to the terminal device, so that the terminal device obtains a target communications device from the at least one communications device by means of screening based on the characteristic information of the at least one dimension for the type of the communications device and the to-be-matched characteristic information of the at least one communications device, and binds to and establishes a connection to the target communications device obtained by means of screening.

According to one or more exemplary embodiments, the method further includes: registering the communications device of the type based on the characteristic information of the at least one dimension for the type of the communications device; and associating the characteristic information of the at least one dimension for the type of the communications device with an image identifier corresponding to the type.

According to one or more exemplary embodiments, the method further includes:

receiving a number obtaining request submitted by a communications device, where the number obtaining request includes at least device information of the communications device and product identifier information of the communications device;

generating number information of the communications device based on the number obtaining request; and associating the number information of the communications device with the characteristic information of the at least one dimension for the type of the communications device.

Herein, the terminal device may be a device such as a mobile phone or a tablet computer. The communications device may be a Bluetooth communications device, or a Wi-Fi communications device on a wireless local area network.

The image identifier may be a two-dimensional code that is set on the communications device, or may be a type number of the communications device.

According to one or more exemplary embodiments, the acquiring an image identifier may be performed by using an image acquisition unit of the terminal device, for example, may be performed by a camera.

The characteristic information of the at least one dimension for the device type of the communications device includes at least one of the following: type identifier information of the communications device, a communication mode supported by the communications device, and official account information.

The type identifier information of the communications device is identifier information for a type of the communications device. According to one or more exemplary embodiments, the communications device further needs to register with the server side, including recording all of the type identifier information of the communications device, the communication mode supported by the communications device, and the official account information on the server side.

It should be noted that the Bluetooth communications device can directly initiate connection information including broadcast information, without requiring the terminal device to send a connection request.

In the to-be-matched characteristic information of the at least one dimension, the at least one dimension may be the same as the foregoing at least one dimension. Details are not described herein again.

Further, the comparing the characteristic information of the at least one dimension for the device type of the communications device with the to-be-matched characteristic information of the at least one dimension for the type of the registered at least one communications device may be: using the characteristic information of the at least one dimension for the device type of the communications device as a screening criterion, screening the to-be-matched characteristic information of the registered at least one communications device based on the screening criterion, and selecting a target communications device that matches the screening criterion.

The binding to the target communications device includes: generating a binding request based on a device identifier of the target communications device, and sending the binding request to the server side, so that the server side associates the target communications device with the terminal device based on the device identifier in the binding request. The binding request may specifically include the device identifier of the target communications device and a device identifier of the terminal device, and then, the device identifiers of the two devices may be associated with each other on the server side, thereby completing the binding.

According to one or more exemplary embodiments, there is further provided an operation scenario of binding to the communications device based on an application, specifically:

Before the acquiring an image identifier, the method further includes: logging in to the server side based on a first account corresponding to a first application, where the first application may be social software, and the first account may be an account registered by a user with a side of the first application, and includes at least a user name.

Correspondingly, the binding to and establishing a communications connection to the communications device includes: generating a binding request based on a device identifier of the communications device and the first account of the first application, and sending the binding request to the server side, so that the server side associates the device identifier of the communications device with the first account based on the binding request to form the communications connection, where the communications connection supports communication with the communications device based on the first account of the first application.

It can be seen that, by means of the foregoing solution, a terminal device can acquire an image identifier, and obtain, based on the image identifier, characteristic information of at least one dimension for a type corresponding to a communications device from a server side; then, after receiving connection information sent by at least one communications device, obtain to-be-matched characteristic information from a server according to identifier information of the communications device; and select a target communications device by comparing the two groups of characteristic information, and establish a connection to the target communications device. In this way, a corresponding image identifier is set for a type of a communications device, and a terminal device can establish a connection to the communications device only by scanning the image identifier corresponding to the type of the communications device, thereby preventing such problems in the conventional art as incapability of increasing production efficiency and excessively high production costs caused by the fact that an image identifier needs to be set for each communications device.

In addition, because the communications device is added by scanning the corresponding image identifier set for the type of the communications device, it is not necessary to worry about a problem that the communications device of this type cannot be added after the image identifier is lost. Moreover, when a user scans an image identifier to add a communications device, only a nearby hardware device within a communication distance range can be added, thoroughly resolving a problem of remotely adding a device by a stranger.

Embodiment 4

Figure 10:
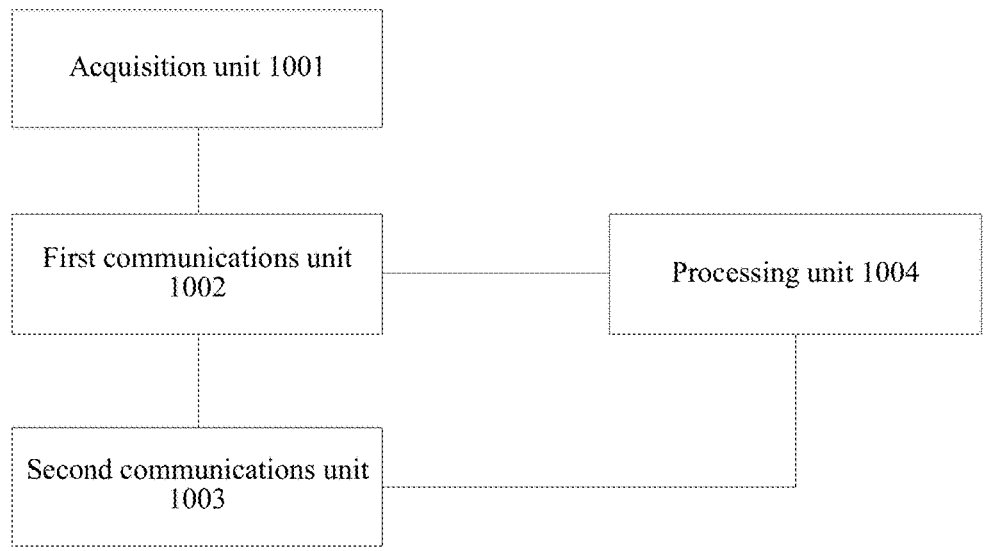
FIG. 10 is a schematic structural composition diagram of a terminal device according to an exemplary embodiment.

According to one or more exemplary embodiments, there is provided a terminal device, as shown in FIG. 10. The terminal device includes:

an acquisition unit 1001 configured to acquire an image identifier of a communications device;

a first communications unit 1002 configured to: send the image identifier to a server side, and receive characteristic information of at least one dimension for a device type of the communications device, the characteristic information being returned by the server side based on the image identifier;

a second communications unit 1003 configured to: detect connection information sent by at least one communications device, and bind to and establish a communications connection to a target communications device; and a processing unit 1004 configured to: obtain a device identifier of the at least one communications device by parsing the connection information, and obtain to-be-matched characteristic information of at least one dimension for a type of the registered at least one communications device from the server side based on the device identifier; and compare the characteristic information of the at least one dimension for the device type of the communications device with the to-be-matched characteristic information of the at least one dimension for the type of the registered at least one communications device, and select the target communications device from the at least one communications device based on a comparison result.

Herein, the terminal device may be a device such as a mobile phone or a tablet computer. The second communications unit 1003 may be a Bluetooth communications device, or a Wi-Fi communications device on a wireless local area network.

The image identifier may be a two-dimensional code that is set on the communications device, or may be a type number of the communications device.

According to one or more exemplary embodiments, the acquiring an image identifier may be performed by using an image acquisition unit of the terminal device, for example, may be performed by a camera.

According to one or more exemplary embodiments, the following descriptions are provided by using an example in which the communications device is a Bluetooth communications device having a Bluetooth communication function:

The characteristic information of the at least one dimension for the device type of the communications device includes at least one of the following: type identifier information of the communications device, a communication mode supported by the communications device, and official account information.

The type identifier information of the communications device is identifier information for a type of the communications device. According to one or more exemplary embodiments, the communications device further needs to register with the server side, including recording all of the type identifier information of the communications device, the communication mode supported by the communications device, and the official account information on the server side.

The second communications unit 1003 is configured to: when the communication mode supported by the communications device is Bluetooth communication, directly detect, by the terminal device, whether at least one piece of connection information is received in a Bluetooth communication mode.

It should be noted that the Bluetooth communications device can directly initiate connection information including broadcast information, without requiring the terminal device to send a connection request.

When the communications device is a Bluetooth communications device, the sent connection information may include at least a MAC address of the communications device. In addition, the connection information may further include official account information and device identifier information of the communications device. The device identifier information is a device identifier that uniquely corresponds to each communications device.

In the to-be-matched characteristic information of the at least one dimension, the at least one dimension may be the same as the foregoing at least one dimension.

The comparing the characteristic information of the at least one dimension for the device type of the communications device with the to-be-matched characteristic information of the at least one dimension for the type of the registered at least one communications device may be further characterized that: the processing unit being configured to: use the characteristic information of the at least one dimension for the device type of the communications device as a screening criterion, screen the to-be-matched characteristic information of the registered at least one communications device based on the screening criterion, and select a target communications device that matches the screening criterion.

The processing unit is configured to generate a binding request based on a device identifier of the target communications device, and the first communications unit is configured to send the binding request to the server side, so that the server side associates the target communications device with the terminal device based on the device identifier in the binding request. The binding request may specifically include the device identifier of the target communications device and a device identifier of the terminal device, and then, the device identifiers of the two devices may be associated with each other on the server side, thereby completing the binding.

It can be seen that, by means of the foregoing solution, the terminal device can acquire an image identifier, and obtain, based on the image identifier, characteristic information of at least one dimension for a type corresponding to a communications device from a server side; after receiving connection information sent by at least one communications device, obtain to-be-matched characteristic information from a server according to identifier information of the communications device; and select a target communications device by comparing the two groups of characteristic information, and establish a connection to the target communications device. In this way, a corresponding image identifier is set for a type of a communications device, and a terminal device can establish a connection to the communications device only by scanning the image identifier corresponding to the type of the communications device, thereby preventing such problems in the conventional art as incapability of increasing production efficiency and excessively high production costs caused by the fact that an image identifier needs to be set for each communications device.

In addition, because the communications device is added by scanning the corresponding image identifier set for the type of the communications device, it is not necessary to worry about a problem that the communications device of this type cannot be added after the image identifier is lost. Moreover, when a user scans an image identifier to add a communications device, only a nearby hardware device within a communication distance range can be added, thoroughly resolving a problem of remotely adding a device by a stranger.

Embodiment 5

According to one or more exemplary embodiments, there is provided a terminal device, as shown in FIG. 10. The terminal device includes:

an acquisition unit 1001 configured to acquire an image identifier of a communications device;

a first communications unit 1002 configured to: send the image identifier to a server side, and receive characteristic information of at least one dimension for a device type of the communications device, the characteristic information being returned by the server side based on the image identifier;

a second communications unit 1003 configured to: detect connection information sent by at least one communications device, and bind to and establish a communications connection to a target communications device; and a processing unit 1004 configured to: obtain a device identifier of the at least one communications device by parsing the connection information, and obtain to-be-matched characteristic information of at least one dimension for a type of the registered at least one communications device from the server side based on the device identifier; and compare the characteristic information of the at least one dimension for the device type of the communications device with the to-be-matched characteristic information of the at least one dimension for the type of the registered at least one communications device, and select the target communications device from the at least one communications device based on a comparison result.

Herein, the terminal device may be a device such as a mobile phone or a tablet computer. The second communications unit 1003 may be a Bluetooth communications device, or a Wi-Fi communications device on a wireless local area network.

The image identifier may be a two-dimensional code that is set on the communications device, or may be a type number of the communications device.

According to one or more exemplary embodiments, the acquiring an image identifier may be performed by using an image acquisition unit of the terminal device, for example, may be performed by a camera.

According to one or more exemplary embodiments, the following descriptions are provided by using an example in which the communications device is a communications device having a Wi-Fi communication function:

The characteristic information of the at least one dimension for the device type of the communications device includes at least one of the following: type identifier information of the communications device, a communication mode supported by the communications device, and official account information.

The type identifier information of the communications device is identifier information for a type of the communications device. Herein, it should be noted that the communications device further needs to register with the server side, including recording all of the type identifier information of the communications device, the communication mode supported by the communications device, and the official account information on the server side.

The second communications unit is configured to: obtain a communication mode supported by the communications device corresponding to the image identifier from the server side; send a connection request based on the communication mode supported by the communications device; and listen on a wireless communication port, and determine whether a response packet sent by the communications device is received.

The connection information may further include official account information and device identifier information of the communications device. The device identifier information is a device identifier that uniquely corresponds to each communications device.

In the to-be-matched characteristic information of the at least one dimension, the at least one dimension may be the same as the foregoing at least one dimension.

Further, the comparing the characteristic information of the at least one dimension for the device type of the communications device with the to-be-matched characteristic information of the at least one dimension for the type of the registered at least one communications device may be: using the characteristic information of the at least one dimension for the device type of the communications device as a screening criterion, screening the to-be-matched characteristic information of the registered at least one communications device based on the screening criterion, and selecting a target communications device that matches the screening criterion.

The processing unit is configured to generate a binding request based on a device identifier of the target communications device.

Correspondingly, the first communications unit is configured to send the binding request to the server side, so that the server side associates the target communications device with the terminal device based on the device identifier in the binding request. The binding request specifically include the device identifier of the target communications device and a device identifier of the terminal device, and then, the device identifiers of the two devices may be associated with each other on the server side, thereby completing the binding.

According to one or more exemplary embodiments, there is further provided an operation scenario of binding to the communications device based on an application, specifically:

The first communications unit is configured to log in to the server side based on a first account corresponding to a first application.

Correspondingly, the second communications unit is configured to: generate a binding request based on a device identifier of the communications device and the first account of the first application, and send the binding request to the server side, so that the server side associates the device identifier of the communications device with the first account based on the binding request to form the communications connection, where the communications connection supports communication with the communications device based on the first account of the first application.

According to one or more exemplary embodiments, there is further provided an operation of selecting a target communications device from matched communications devices, including:

the processing unit being further configured to: determine, based on the comparison result, a communications device matching the characteristic information of the at least one dimension; obtain signal strength information between the communications device and the terminal device; and select the target communications device from the communications device based on the signal strength information.

The signal strength information may be determined by the terminal device according to the received connection information sent by the communications device.

It can be seen that, by means of the foregoing solution, the terminal device can acquire an image identifier, and obtain, based on the image identifier, characteristic information of at least one dimension for a type corresponding to a communications device from a server side; then, after receiving connection information sent by at least one communications device, obtain to-be-matched characteristic information from a server according to identifier information of the communications device; and select a target communications device by comparing the two groups of characteristic information, and establish a connection to the target communications device. In this way, a corresponding image identifier is set for a type of a communications device, and a terminal device can establish a connection to the communications device only by scanning the image identifier corresponding to the type of the communications device, thereby preventing such problems in the conventional art as incapability of increasing production efficiency and excessively high production costs caused by the fact that an image identifier needs to be set for each communications device.

In addition, because the communications device is added by scanning the corresponding image identifier set for the type of the communications device, it is not necessary to worry about a problem that the communications device of this type cannot be added after the image identifier is lost. Moreover, when a user scans an image identifier to add a communications device, only a nearby hardware device within a communication distance range can be added, thoroughly resolving a problem of remotely adding a device by a stranger.

Embodiment 6

Figure 11:
FIG. 11 is a schematic composition diagram of a server system according to an exemplary embodiment.

According to one or more exemplary embodiments, there is provided a server system, shown FIG. 11. The server system includes:

a communications device server 1101 configured to register characteristic information of at least one dimension for a type of a communications device with a social network server; and the social network server 1102 configured to: receive an image identifier sent by a terminal device; receive number information of a communications device sent by the terminal device; obtain characteristic information of at least one dimension for a type of a communications device based on the image identifier, and send the characteristic information of the at least one dimension for the type of the communications device to the terminal device; and obtain to-be-matched characteristic information of at least one communications device based on the number information, and send the to-be-matched characteristic information to the terminal device.

The communications device server 1101 is configured to register the communications device of the type based on the characteristic information of the at least one dimension for the type of the communications device; and the social network server 1102 is configured to associate the characteristic information of the at least one dimension for the type of the communications device with an image identifier corresponding to the type.

The communications device server includes a communications device service unit which is configured to register the communications device of the type based on the characteristic information of the at least one dimension for the type of the communications device.

The social network server is configured to associate the characteristic information of the at least one dimension for the type of the communications device with an image identifier corresponding to the type.

Herein, the terminal device may be a device such as a mobile phone or a tablet computer. The communications device may be a Bluetooth communications device, or a Wi-Fi communications device on a wireless local area network.

The image identifier may be a two-dimensional code that is set on the communications device, or may be a type number of the communications device.

According to one or more exemplary embodiments, the acquiring an image identifier may be performed by using an image acquisition unit of the terminal device, for example, may be performed by a camera.

The characteristic information of the at least one dimension for the device type of the communications device includes at least one of the following: type identifier information of the communications device, a communication mode supported by the communications device, and official account information.

The type identifier information of the communications device is identifier information for a type of the communications device. According to one or more exemplary embodiments, the communications device further needs to register with the server side, including recording all of the type identifier information of the communications device, the communication mode supported by the communications device, and the account information on the server side.

It should be noted that the Bluetooth communications device can directly initiate connection information including broadcast information, without requiring the terminal device to send a connection request.

In the to-be-matched characteristic information of the at least one dimension, the at least one dimension may be the same as the foregoing at least one dimension.

The social network server is configured to: receive a number obtaining request submitted by a communications device, where the number obtaining request device information of the communications device and product identifier information of the communications device; generate number information of the communications device based on the number obtaining request; and associate the number information of the communications device with the characteristic information of the at least one dimension for the type of the communications device.

It can be seen that, by means of the foregoing solution, a terminal device can acquire an image identifier, and obtain, based on the image identifier, characteristic information of at least one dimension for a type corresponding to a communications device from a server side; then, after receiving connection information sent by at least one communications device, obtain to-be-matched characteristic information from a server according to identifier information of the communications device; and select a target communications device by comparing the two groups of characteristic information, and establish a connection to the target communications device. In this way, a corresponding image identifier is set for a type of a communications device, and a terminal device can establish a connection to the communications device only by scanning the image identifier corresponding to the type of the communications device, thereby preventing such problems in the conventional art as incapability of increasing production efficiency and excessively high production costs caused by the fact that an image identifier needs to be set for each communications device.

In addition, because the communications device is added by scanning the corresponding image identifier set for the type of the communications device, it is not necessary to worry about a problem that the communications device of this type cannot be added after the image identifier is lost. Moreover, when a user scans an image identifier to add a communications device, only a nearby hardware device within a communication distance range can be added, thoroughly resolving a problem of remotely adding a device by a stranger.

Figure 12:
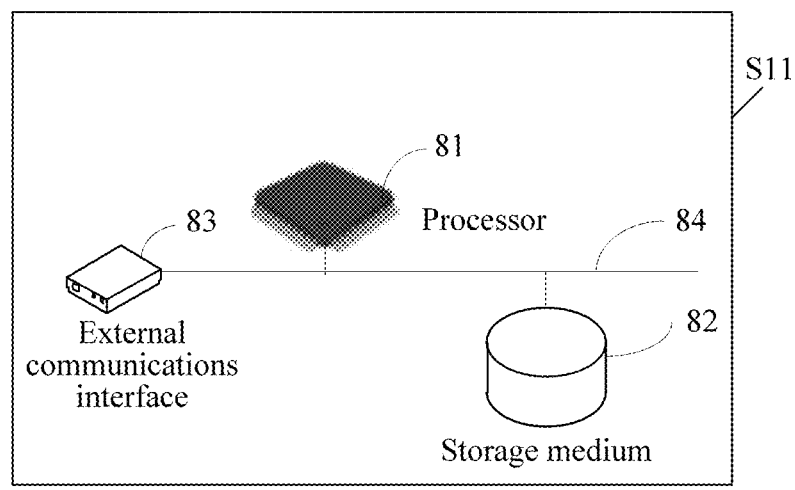
FIG. 12 is a schematic structural composition diagram of hardware according to an exemplary embodiment.

Based on the foregoing scenario, the server or the terminal device in the system provided in this embodiment may serve as an example of hardware S11, as shown in FIG. 12, including a processor 81, a storage medium 82, and at least one external communications interface 83. The processor 81, the storage medium 82, and the external communications interface 83 are connected to each other by using a bus 84.

According to one or more exemplary embodiments, the multiple units of the terminal device may be disposed in a processor of a same device, or may be respectively disposed in processors in different devices. When the multiple units are disposed in a processor of a same device, the processor performs the following processing:

acquiring an image identifier of a communications device, sending the image identifier to a server side, and receiving characteristic information of at least one dimension for a device type of the communications device, the characteristic information being returned by the server side based on the image identifier;

detecting connection information sent by at least one communications device, obtaining a device identifier of the at least one communications device by parsing the connection information, and obtaining to-be-matched characteristic information of at least one dimension for a type of the registered at least one communications device from the server side based on the device identifier;

comparing the characteristic information of the at least one dimension for the device type of the communications device with the to-be-matched characteristic information of the at least one dimension for the type of the registered at least one communications device, and selecting a target communications device from the at least one communications device based on a comparison result; and binding to and establishing a communications connection to the target communications device.

According to one or more exemplary embodiments, when the foregoing hardware is applied to the server side, the multiple units on the server side may be disposed in a processor of a same server, or may be respectively disposed in processors of different servers. When the multiple units are disposed in a processor of a same server, the processor performs the following processing:

obtaining characteristic information of at least one dimension for a type of a registered communications device;

receiving an image identifier sent by a terminal device, obtaining characteristic information of at least one dimension for a type of a communications device based on the image identifier, and sending the characteristic information of the at least one dimension for the type of the communications device to the terminal device; and receiving number information of the communications device sent by the terminal device, obtaining to-be-matched characteristic information of at least one communications device based on the number information, and sending the to-be-matched characteristic information to the terminal device, so that the terminal device obtains a target communications device from the at least one communications device; by means of screening based on the characteristic information of the at least one dimension for the type of the communications device and the to-be-matched characteristic information of the at least one communications device, and binds to and establishes a connection to the target communications device obtained by means of screening.

A person of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

A communications device connection method, a terminal device, and a server system according to the embodiments of the present invention described in detail above. The principle and implementations of the present disclosure are described herein by using specific examples. The descriptions of the embodiments of the present invention are merely used for helping understand the method and core ideas of the present disclosure. In addition, a person skilled in the art can make a the present disclosure in terms of the specific implementations and application scopes according to the ideas of the present disclosure. Therefore, the content of the specification shall not be construed as a limit to the present disclosure.

What is claimed is:

1. A communications device connection method applied to a terminal device, the method comprising:
   acquiring an image identifier of a communications device, sending the image identifier to a server, and receiving characteristic information of at least one dimension for a device type of the communications device, the characteristic information being returned by the server based on the image identifier;
   detecting connection information sent by at least one communications device, obtaining a device identifier of the at least one communications device by parsing the connection information, and obtaining to-be-matched characteristic information of at least one dimension for a type of registered at least one communications device from the server based on the device identifier;
   comparing the characteristic information of the at least one dimension for the device type of the communications device with the to-be-matched characteristic information of the at least one dimension for the type of the registered at least one communications device, and selecting a target communications device from the at least one communications device based on a comparison result; and
   binding to and establishing a communications connection to the target communications device.

2. The method according to claim 1, wherein the characteristic information of the at least one dimension for the device type of the communications device comprises:
   type identifier information of the communications device and a communication mode supported by the communications device.

3. The method according to claim 2, wherein, before the detecting connection information sent by at least one communications device, the method further comprises:
   obtaining the communication mode supported by the communications device corresponding to the image identifier from the server; and
   sending a connection request based on the communication mode supported by the communications device.

4. The method according to claim 1, wherein the binding to the target communications device further comprises:
   generating a binding request based on a device identifier of the target communications device; and
   sending the binding request to the server, so that the server associates the target communications device with the terminal device based on the device identifier in the binding request.

5. The method according to claim 1, wherein before the acquiring an image identifier, the method further comprises:
   logging in to the server based on a first account corresponding to a first application, and
   wherein the binding to and establishing a communications connection to the communications device further comprises: generating a binding request based on a device identifier of the communications device and a first account of a first application, and sending the binding request to the server, so that the server associates the device identifier of the communications device with the first account based on the binding request to form the communications connection, wherein the communications connection supports communication with the communications device based on the first account of the first application.

6. The method according to claim 1, wherein the selecting a target communications device from the at least one communications device based on a comparison result further comprises:
- determining, based on the comparison result, a communications device matching the characteristic information of the at least one dimension;
- obtaining signal strength information between the communications device and the terminal device; and
- selecting the target communications device from the communications device based on the signal strength information.

7. A communications device connection method applied to a server, the method comprising:
- obtaining characteristic information of at least one dimension for a type of a registered communications device;
- receiving an image identifier sent by a terminal device, obtaining characteristic information of at least one dimension for a type of a communications device based on the image identifier, and sending the characteristic information of the at least one dimension for the type of the communications device to the terminal device; and
- receiving number information of the communications device sent by the terminal device, obtaining to-be-matched characteristic information of at least one communications device based on the number information, and sending the to-be-matched characteristic information to the terminal device, so that the terminal device obtains a target communications device from the at least one communications device by means of screening based on the characteristic information of the at least one dimension for the type of the communications device and the to-be-matched characteristic information of the at least one communications device, and binds to and establishes a connection to the target communications device obtained by means of screening.

8. The method according to claim 7, further comprising:
- registering the communications device of the type based on the characteristic information of the at least one dimension for the type of the communications device; and
- associating the characteristic information of the at least one dimension for the type of the communications device with an image identifier corresponding to the type.

9. The method according to claim 7, further comprising:
- receiving a number obtaining request submitted by a communications device, wherein the number obtaining request comprises at least device information of the communications device and product identifier information of the communications device;
- generating number information of the communications device based on the number obtaining request; and
- associating the number information of the communications device with the characteristic information of the at least one dimension for the type of the communications device.

10. A terminal device, comprising:
- at least one memory operable to store program code; and
- at least one processor operable to read the program code and operate as instructed by the program code, the program code comprising:
  - acquisition code configured to cause the at least one processor to acquire an image identifier of a communications device;
  - first communications code configured to cause the at least one processor to: send the image identifier to a server, and receive characteristic information of at least one dimension for a device type of the communications device, the characteristic information being returned by the server based on the image identifier;
  - second communications code configured to cause the at least one processor to: detect connection information sent by at least one communications device, and bind to and establish a communications connection to a target communications device; and
  - processing code configured to cause the at least one processor to: obtain a device identifier of the at least one communications device by parsing the connection information, and obtain to-be-matched characteristic information of at least one dimension for a type of registered at least one communications device from the server based on the device identifier; and compare the characteristic information of the at least one dimension for the device type of the communications device with the to-be-matched characteristic information of the at least one dimension for the type of the registered at least one communications device, and select the target communications device from the at least one communications device based on a comparison result.

11. The terminal device according to claim 10, wherein the second communications code is further configured to cause the at least one processor to:
- obtain a communication mode supported by the communications device corresponding to the image identifier from the server; and
- send a connection request based on the communication mode supported by the communications device.

12. The terminal device according to claim 10, wherein:
- the processing code is further configured to cause the at least one processor to generate a binding request based on a device identifier of the target communications device; and
- the first communications code is further configured to cause the at least one processor to send the binding request to the server.

13. The terminal device according to claim 10, wherein:
- the first communications code is further configured to cause the at least one processor to log in to the server based on a first account corresponding to a first application; and
- the second communications code is further configured to cause the at least one processor to: generate a binding request based on a device identifier of the communications device and the first account of the first application, and send the binding request to the server, so that the server associates the device identifier of the communications device with the first account based on the binding request to form the communications connection, wherein the communications connection supports communication with the communications device based on the first account of the first application.

14. The terminal device according to claim 10, wherein the processing code is further configured to cause the at least one processor to:
- determine, based on the comparison result, a communications device matching the characteristic information of the at least one dimension;
- obtain signal strength information between the communications device and the terminal device; and select the target communications device from the communications device based on the signal strength information.

15. A server system, comprising:
a communications device server comprising at least one first processor and configured to register characteristic information of at least one dimension for a type of a communications device with a social network server; and
the social network server comprising at least one second processor and configured to: receive an image identifier sent by a terminal device; receive number information of a communications device sent by the terminal device; obtain characteristic information of at least one dimension for a type of a communications device based on the image identifier, and send the characteristic information of the at least one dimension for the type of the communications device to the terminal device; and obtain to-be-matched characteristic information of at least one communications device based on the number information, and send the to-be-matched characteristic information to the terminal device upon which comparison between the characteristic information of the at least one dimension for the type of the communications device and the to-be-matched characteristic information of the at least one communications device is performed, a target communications device is selected from the at least one communications device based on a comparison result, and a communications connection of the terminal device to the target communications device established.

16. The server system according to claim 15, wherein:
the communications device server is further configured to register the communications device of the type based on the characteristic information of the at least one dimension for the type of the communications device; and
the social network server is further configured to associate the characteristic information of the at least one dimension for the type of the communications device with an image identifier corresponding to the type.

17. The server system according to claim 16, wherein the social network server is further configured to:
receive a number obtaining request submitted by a communications device, wherein the number obtaining request comprises at least device information of the communications device and product identifier information of the communications device;
generate number information of the communications device based on the number obtaining request; and
associate the number information of the communications device with the characteristic information of the at least one dimension for the type of the communications device.

18. A non-transitory computer readable medium configured to store instructions applied to a terminal device, the instructions causing a computer to:
acquire an image identifier of a communications device, send the image identifier to a server, and receive characteristic information of at least one dimension for a device type of the communications device, the characteristic information being returned by the server based on the image identifier;
detect connection information sent by at least one communications device, obtain a device identifier of the at least one communications device by parsing the connection information, and obtain to-be-matched characteristic information of at least one dimension for a type of the registered at least one communications device from the server based on the device identifier;
compare the characteristic information of the at least one dimension for the device type of the communications device with the to-be-matched characteristic information of the at least one dimension for the type of the registered at least one communications device, and select a target communications device from the at least one communications device based on a comparison result; and
bind to and establish a communications connection to the target communications device.

19. The non-transitory computer readable medium of claim 18, wherein the characteristic information of the at least one dimension for the device type of the communications device comprises type identifier information of the communications device and a communication mode supported by the communications device.

20. The non-transitory computer readable medium of claim 18, wherein the instructions further causing the computer to:
generate a binding request based on a device identifier of the target communications device; and
send the binding request to the server, so that the server associates the target communications device with the terminal device based on the device identifier in the binding request.

* * * * *